Patented Apr. 30, 1935

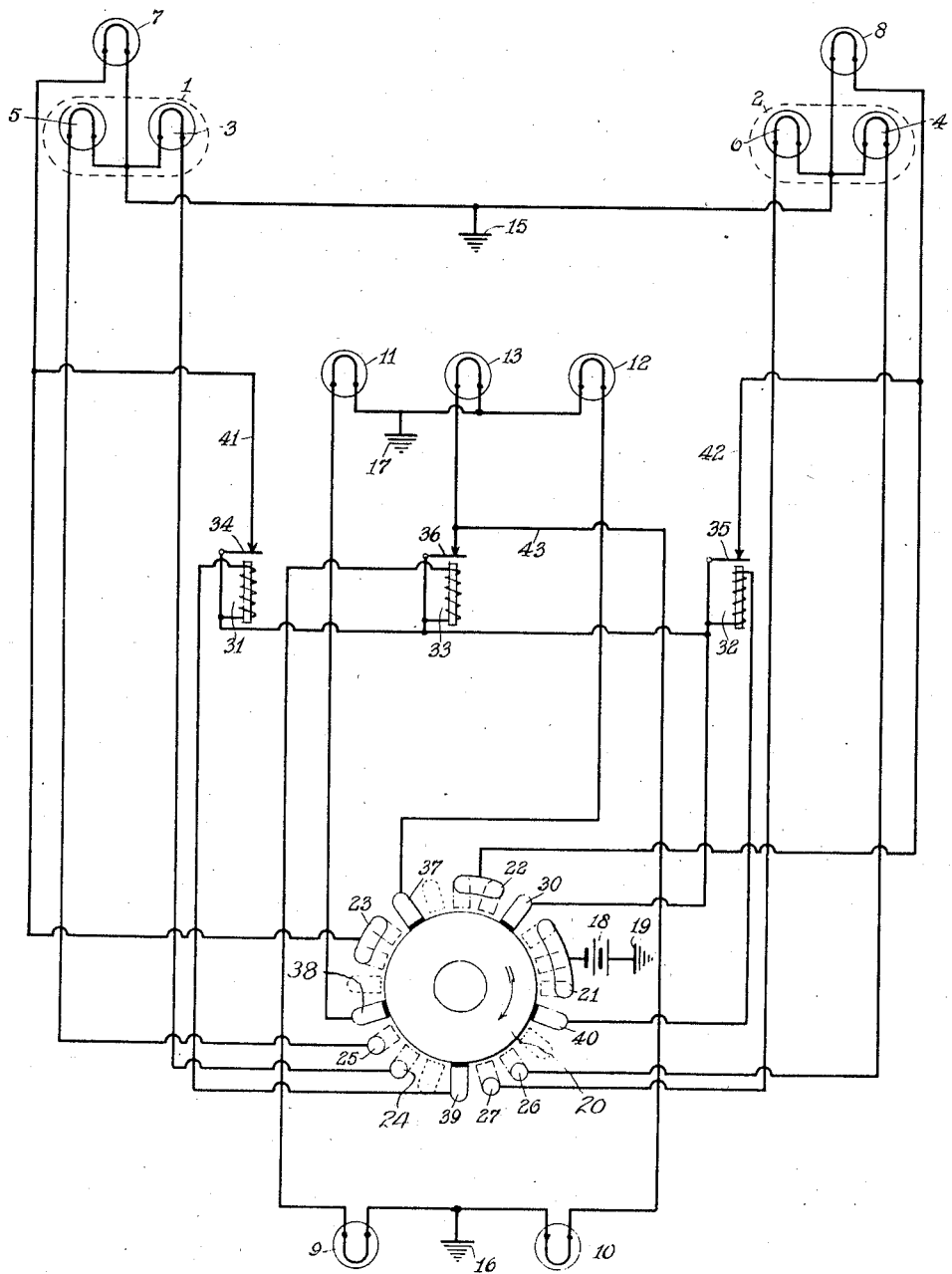

1,999,781

UNITED STATES PATENT OFFICE 1,999,781

CONTROL FOR AUTOMOBILE LIGHTING SYSTEMS

Arthur P. Pinkler, Newark, N. J.

Application November 3, 1932, Serial No. 640,941

2 Claims. (Cl. 177—311)

The invention relates to automobile lighting systems, and more particularly to the control thereof.

The invention has for an object the provision of an automatic switching arrangement whereby when any individual head- or tail-light fails, an emergency light will automatically be cut into circuit as a temporary substitute for the same. The invention has for a further object the provision of a single controller switch device to this end, which device is utilized also for effecting illumination of the usual parking lamps associated with an automobile, the said lamps serving at the same time as the emergency lights for the lights of the head-lamps.

Still another object of the invention resides in the provision of a switching device of the aforesaid nature and the provision of circuit connections whereby the usual succession of lighting operations may be effected, that is to say, the first switch position will effect energization of the parking lamps and of the tail-lamp, the second of the "low-beam" for the head-lamps and of the tail-lamp, and the third and final position of the "high-beam" for the head-lamps, as well as of the tail-lamp.

A further object of the invention resides in the provision of pilot lamps for indicating which of the head-lamps may have become defective, or the tail-lamp.

The accompanying drawing illustrates diagrammatically the novel switching arrangement and circuit connections embodying my invention and as applied to the usual lamps of an automobile lighting system, the three successive positions which the brushes of the control switch may assume being indicated respectively by dotted lines, dot-and-dash lines, and dash lines.

As shown, a pair of head-lamps, such as are usually provided on opposite sides at the front of an automobile, is represented at 1 and 2, respectively, these lamps being preferably of the duplex filament type, the respective lights or filaments 3 and 4 thereof affording the low-beam illumination and lights or filaments 5 and 6 of the respective lamps the high-beam illumination.

There is to be associated with these head-lamps at the front of the self-propelled vehicle the usual parking lamps 7 and 8 which, in some instances, may be incorporated with the head-lamps as an additional filament. These parking lamps 7 and 8 serve as the emergency lights to be energized in the event of failure of the lights of either of the head-lamps 1 and 2.

A tail-lamp 9 is also provided and which has associated therewith the emergency lamp 10, which may be combined with lamp 9 as a multi-filament lamp or be provided as an individual lamp, as shown. If desired, additional or pilot lamps 11, 12 and 13 may be provided and these will then be located conveniently to the operator of an automobile, the said lamps 11 and 12 when energized serving to indicate that failure has occurred at a lamp 1 or 2 respectively, and that the emergency lamp provided therefor is energized. Similarly, lamp 13 will notify the operator of the vehicle that the tail-lamp 9 has failed and that its emergency lamp 10 is in operation.

One side of each of the filaments of lights 3, 5 and 7 as well as of the filaments of lights 4, 6 and 8, is grounded as at 15; and the tail-lamp 9 with its associated emergency lamp 10 is likewise grounded as at 16, while the pilot lamps are grounded as at 17. The battery 18, or other source of electrical supply for energizing the individual lamps as desired, is grounded at 19 so that if the opposite and positive pole of the battery 18 is connected with any of the ungrounded sides of the light filaments aforesaid, the same will be energized and the corresponding lamp caused to be illuminated.

To effect this energization of the desired lamps and in the required sequence, while at the same time providing for energization of their associated emergency lamps when required, the following switching device and circuit arrangement have been devised. A circuit-controller 20, preferably of the rotary type, is provided and, as shown, is designed to operate clockwise to successively cause energization of the parking lamps 7 and 8 and tail-lamp 9, of the low-beam filaments 3 and 4 for the head-lamps 1 and 2 as well as of tail-lamp 9, and finally of the high-beam filaments 5 and 6, together with the tail-lamp 9.

To this end, the positive side of battery 18 is connected to a three-position segment 21 of the switching device, the parking lamp 8 to a two-position segment 22, and the parking lamp 7 to a two-position segment 23. The low-beam filament 3 and high-beam filament 5 of lamp 1 are connected respectively to the single-position contacts 24 and 25, while the corresponding filaments 4 and 6 of lamp 2 are connected to the single-position contacts 26 and 27.

An energy-supplying brush 30 designed for three-position contact with the segment 21 supplies, when engaging such contact, energy to the coils of three relays 31, 32 and 33, respectively, and also to the armatures or one side of the respective relay contacts 34, 35 and 36. The next succeeding brush 37 is connected directly with the ungrounded side of pilot lamp 12, and the following brush 38 with the ungrounded side of the filament of pilot lamp 11. Two additional brushes 39 and 40 are provided, the former being connected in series with the coil of relay 31 and the latter in series with the coil of relay 32.

By following the circuit connections, it will be observed that when brush 30 is in its first position in contact with segment 21, relays 31 and 32 will not be energized due to the fact that their respective circuits are open at brushes 39 and 40 which do not make any contact in their first positions. The contacts 34 and 35 of the relays therefore remain closed and power is supplied through the leads 41 and 42 therefrom to the corresponding parking lamps 7 and 8.

Relay 33, however, is energized, being included in series with the tail-lamp 9 which is thus also energized. None of the pilot lamps 11, 12 and 13 is energized, as the tail-light 9 is functioning properly and the parking lights 7 and 8 are not protected.

In the succeeding or second position of the controller, brush 30 still remains in contact with the source of energy through segment 21, but both of the brushes 39 and 40 now engage their respective contacts 24 and 26. This closes the circuit, through the respective relays 31 and 32, to the lights 3 and 4 to ground 15, causing the said lights to be energized and at the same time opening the circuit to the parking lamps at the contacts 34 and 35, through the action of the respective relays. The operation of the tail-lamp 9 has not been affected thereby.

At the same time, brushes 37 and 38 have engaged their respective segments 22 and 23 so that if either of the lights 3 or 4 should fail, the corresponding emergency lamps 7 or 8 would be energized, as a relay 31 or 32 would thereby become deenergized, and a corresponding contact 34 or 35 closed. This transfers, also, energy to the corresponding pilot lamp 11 or 12.

In the next and final position, brush 30 still remains energized through contact with segment 21, and the brushes 37 and 38 continue on their respective segments 22 and 23. Brushes 39 and 40, however, have left their corresponding contacts 24 and 26 so that the lights 3 and 4 are extinguished, but these brushes now engage contacts 25 and 27 of the high-beam lights 5 and 6 which are thereby energized. Lamp 9 functions as hereinbefore set forth with relay contact 36 open.

The relay contacts 34 and 35 remain open so long as the lamps 5 and 6 are energized through the controlling brushes 39 and 40, but if their circuits for any reason fail, a corresponding pilot lamp 11 or 12 will be energized to give notice of such failure and at the same time a corresponding parking or emergency lamp 7 or 8 will be energized through the closing of a relay contact 34 or 35.

If the tail-lamp 9 should, for any reason, fail, relay 33 will be deenergized to close the relay contact 36 which, through the lead 43, will cause lamp 10 to become energized.

Thus, not only may the various lamps of the automobile lighting system be energized in the usual succession, but should any of the individual head-lights or the tail-light fail, a corresponding emergency lamp will immediately and automatically be brought into operation and a visual or other notice given the operator of the vehicle and in such a manner as to locate the particular point where the failure occurred.

I claim:

1. An automobile lighting system embodying a pair of electric head-lamps and a tail-lamp, the head-lamps each embodying at least two individually operable lights, a pair of parking or emergency lamps associated with the head-lamps, and an emergency lamp associated with the tail-lamp, the one side of each of said lamps being grounded, a source of energy for all of the said lamps and having one side grounded, a relay for each of the two head-lamps and a relay for the tail-lamp, a three-position circuit controller embodying a three-position segment, and two double single-position contacts, together with brushes movable by the controller—one brush adapted for engaging the three-position segment in all of its three positions, and a pair of brushes for engaging successively the single-position contacts of the respective double single-position contacts in the second and third positions of said controller, a lead from the three-position segment-engaging brush to one side of the windings of all of the relays, the said three-position segment being permanently connected to the source of power, leads from the double single-position contacts to the lights of the respective head-lamps, leads from the pair of single-position contact-engaging brushes to the windings of the respective head-light relays to complete the energizing circuits of said relays when the said single-position contact-engaging brushes engage either one of the double single-position contacts, leads from the respective head-light emergency lamps to the respective head-light relay contacts for energization of the emergency lamps therethrough, said relay armatures being connected to the common energizing relay lead, a lead from the common energizing relay lead to the tail-lamp through its relay, and a lead from said common energizing relay lead to the emergency tail-lamp through the tail-lamp relay contact.

2. An automobile lighting system embodying a pair of electric head-lamps and a tail-lamp, the head-lamps each embodying at least two individually operable lights, a pair of parking or emergency lamps associated with the head-lamps, and an emergency lamp associated with the tail-lamp, a pair of pilot lamps adapted for indicating the electrical condition of both of the lights of the respective head-lamps, and a pilot lamp for indicating the electrical condition of the tail-lamp, the one side of each of said lamps being grounded, a source of energy for all of the said lamps and having one side grounded, a relay for each of the two head-lamps and a relay for the tail-lamp, a three-position circuit controller embodying a three-position segment, two two-position segments and two double single-position contacts, together with brushes movable by the controller—one brush adapted for engaging the three-position segment in all of its three-positions, a pair of brushes for engaging the respective two-position segments in the second and third position of the controller, and a pair of brushes for engaging successively the single-position contacts of the respective double single-position contacts in the second and third positions of said controller, a lead from the three-position segment-engaging brush to one side of the windings of all of the relays, the said three-position segment being permanently connected to the source of power, leads from the two-position contacts to the respective emergency head-lamps, leads from the double single-position contacts to the lights of the respective head-lamps, leads from the two-position segment-engaging brushes to the respective head-light pilot lamps, leads from the pair of single-position contact-engaging brushes to the windings of the respective head-light relays to complete the energizing circuits of said relays when the said single-position contact-engaging brushes engage either one of the double single-position contacts, leads from the respective head-light emergency lamps to the respective head-light relay contacts for energization of the emergency lamps therethrough, said relay armatures being connected to the common energizing relay lead, a lead from the common energizing relay lead to the tail-lamp through its relay, said relay armature being connected to said common energizing relay lead, a lead from said tail-lamp pilot lamp to the tail-lamp relay contact, and a further lead from said common energizing relay lead to the emergency tail-lamp through the tail-lamp relay contact.

ARTHUR P. PINKLER.